United States Patent
Zheng et al.

(10) Patent No.: US 10,360,136 B2
(45) Date of Patent: Jul. 23, 2019

(54) DASHBOARD EXECUTION ENGINE

(71) Applicant: salesforce.com, inc., San Francisco, CA (US)

(72) Inventors: Zuye Zheng, San Francisco, CA (US); James Diefenderfer, San Francisco, CA (US); Srividhya Agandeswaran, San Francisco, CA (US); Deepinder Badesha, San Francisco, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 0 days.

(21) Appl. No.: 15/603,111

(22) Filed: May 23, 2017

(65) Prior Publication Data
US 2018/0341572 A1   Nov. 29, 2018

(51) Int. Cl.
G06F 9/44    (2018.01)
G06F 11/36   (2006.01)

(52) U.S. Cl.
CPC .................. G06F 11/3664 (2013.01)

(58) Field of Classification Search
CPC .......... G06F 11/3664; G06F 3/04847
USPC ....................................... 717/125
See application file for complete search history.

(56) References Cited

U.S. PATENT DOCUMENTS

| | | |
|---|---|---|
| 4,674,043 A | 6/1987 | Hernandez et al. |
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |

(Continued)

OTHER PUBLICATIONS salesforce.com, Inc., Introducing the New Salesforce Analytics Cloud, Everything You Need to Know, Ebook, Feb. 19, 2015, pp. 1-12. Website: https://www.slideshare.net/MishaWilliams/ebook-introducing-wave-analytics-cloud.

(Continued)

*Primary Examiner* — Wei Y Zhen
*Assistant Examiner* — Lanny N Ung
(74) *Attorney, Agent, or Firm* — Schwabe Williamson & Wyatt

(57) ABSTRACT

A user system includes a user interface, a processor, and one or more stored sequences of instructions. The one or more stored sequences of instructions, when executed by the processor, cause the processor to display a script field within an editor dashboard, of a runtime environment, displayed on the user interface, the editor dashboard configured to define an interactive dashboard of the runtime environment, identify a script entry input into the script field, parse the script entry to identify an operation to be performed within the interactive dashboard in response to a trigger event, and associate the operation with the interactive dashboard, so that the operation will be performed within the interactive dashboard in response to the trigger event based on the association.

19 Claims, 14 Drawing Sheets

(56) References Cited

U.S. PATENT DOCUMENTS

| | | | |
|---|---|---|---|
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,890 B2 | 4/2003 | Mundell et al. |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,651,241 B1 * | 11/2003 | Hernandez, III ......... G06F 8/30 717/110 |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,624,338 B2 | 11/2009 | Opitz et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,190,619 B2 | 5/2012 | Lehtipalo et al. |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,052,817 B2 | 6/2015 | Hotelling |
| 9,092,572 B2 * | 7/2015 | Shaphy ............... G06F 11/3664 |
| 9,817,891 B1 | 11/2017 | Eksteen et al. |
| 10,114,896 B2 | 10/2018 | Junginger et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Fluang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0143567 A1 * | 7/2004 | Dettinger .......... G06F 17/30389 |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |

(56) References Cited

U.S. PATENT DOCUMENTS

| | | |
|---|---|---|
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0150820 A1* | 6/2007 | Salvo ................ G06F 8/38 715/760 |
| 2007/0250472 A1 | 10/2007 | Dettinger et al. |
| 2007/0300151 A1* | 12/2007 | Araki ............ G06F 17/30905 715/249 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0233694 A1* | 9/2012 | Baliga ............... G06F 21/568 726/23 |
| 2012/0266244 A1* | 10/2012 | Green ............... G06F 21/566 726/24 |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0359537 A1 | 12/2014 | Jackobson et al. |
| 2016/0188686 A1* | 6/2016 | Hopkins ........... G06F 17/3061 707/602 |
| 2017/0344457 A1* | 11/2017 | Wagiaalla ......... G06F 11/3664 |

OTHER PUBLICATIONS

Listing of Related Cases, Jun. 7, 2017.

* cited by examiner

ABOARD EXECUTION ENGINE

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to a runtime environment. In some examples, the runtime environment may include a dashboard application.

BACKGROUND

Dashboard applications provide a user the ability to view collections of data in visual presentations. Legacy dashboard applications provided predefined operations that could be performed with the data, with very few opportunities for user customization of the operations. In instances where users could customize the operations, small errors (such as syntax errors) could cause the dashboard application crash or perform undesirable operations.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Figure 1A:
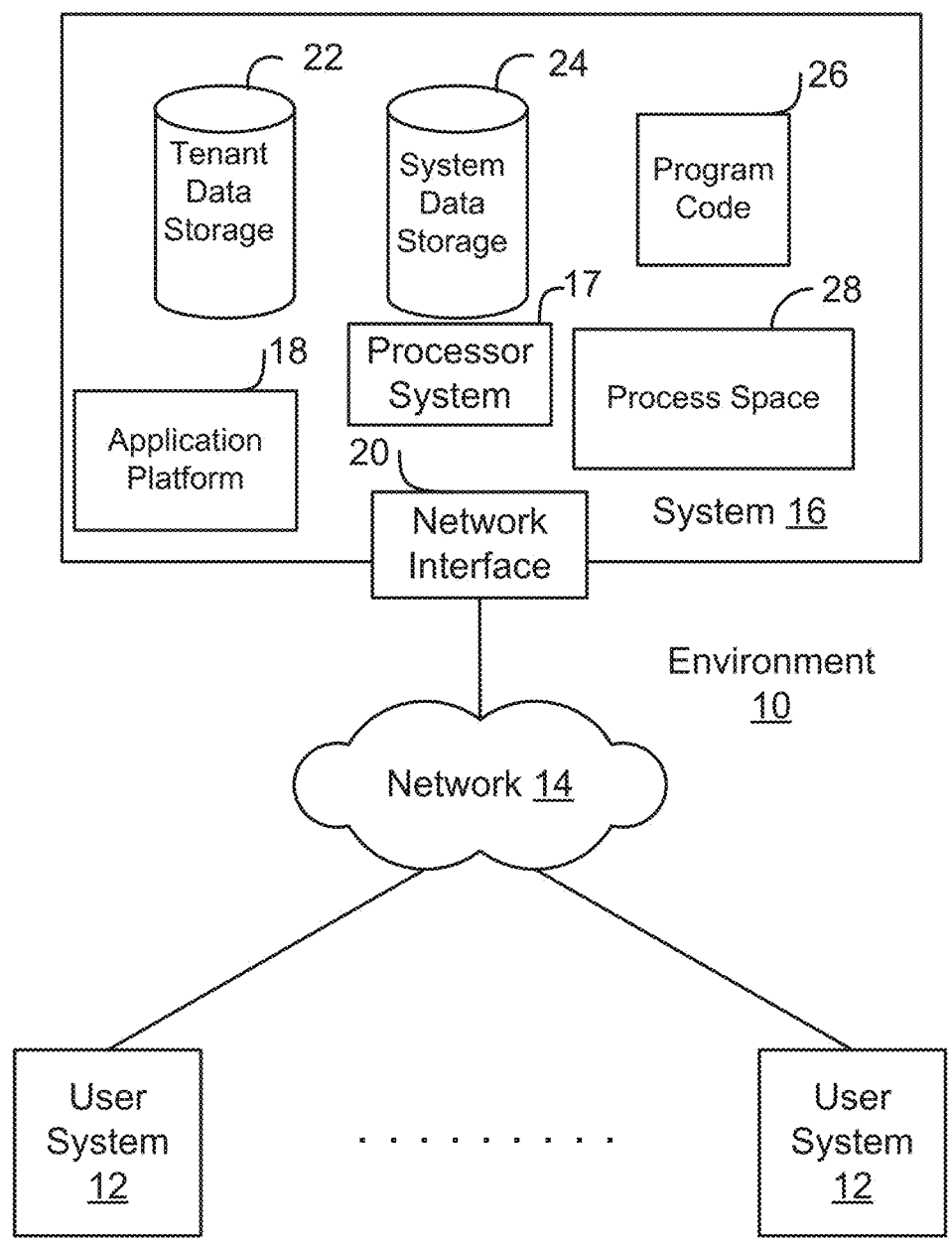
FIG. 1A shows a block diagram of an example environment in which an on-demand database service can be used according to some implementations.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for identifying articles helpful in resolving user queries.

A database system might display a case associated with a customer support query. The database system may initiate a search for other cases related to the new case. The database system may extract relevant terms from the title and/or description provided in the new case using a term weighting algorithm, such as more like this (MLT). The relevant terms are then used in a search query for identifying the related cases.

The database system identifies articles linked to the related cases, ranks the articles, and causes the articles to be displayed on a remote user system in an order based on the ranking. The database system may rank the articles based on a number of related cases linked to the articles. The database system also may rank the article based on other parameters, such as relevancy scores for the related cases, labels assigned to the cases, last modified dates of the related cases, etc.

The database system may identify more relevant articles by first finding related cases that use a similar vocabulary to describe similar customer problems. The database system then identifies the articles that were previously determined to help resolve the prior problems. Thus, the database system may bridge the gap between vocabularies used by customers to describe problems and vocabularies used in articles to describe solutions to those problems.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, inc. of San Francisco, Calif. salesforce.com, inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by salesforce.com, inc. and can be implemented in the context of various other database systems such as cloud-based systems that are not part of a multi-tenant database system or which do not provide enterprise social networking services.

I. Example System Overview

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B).

As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
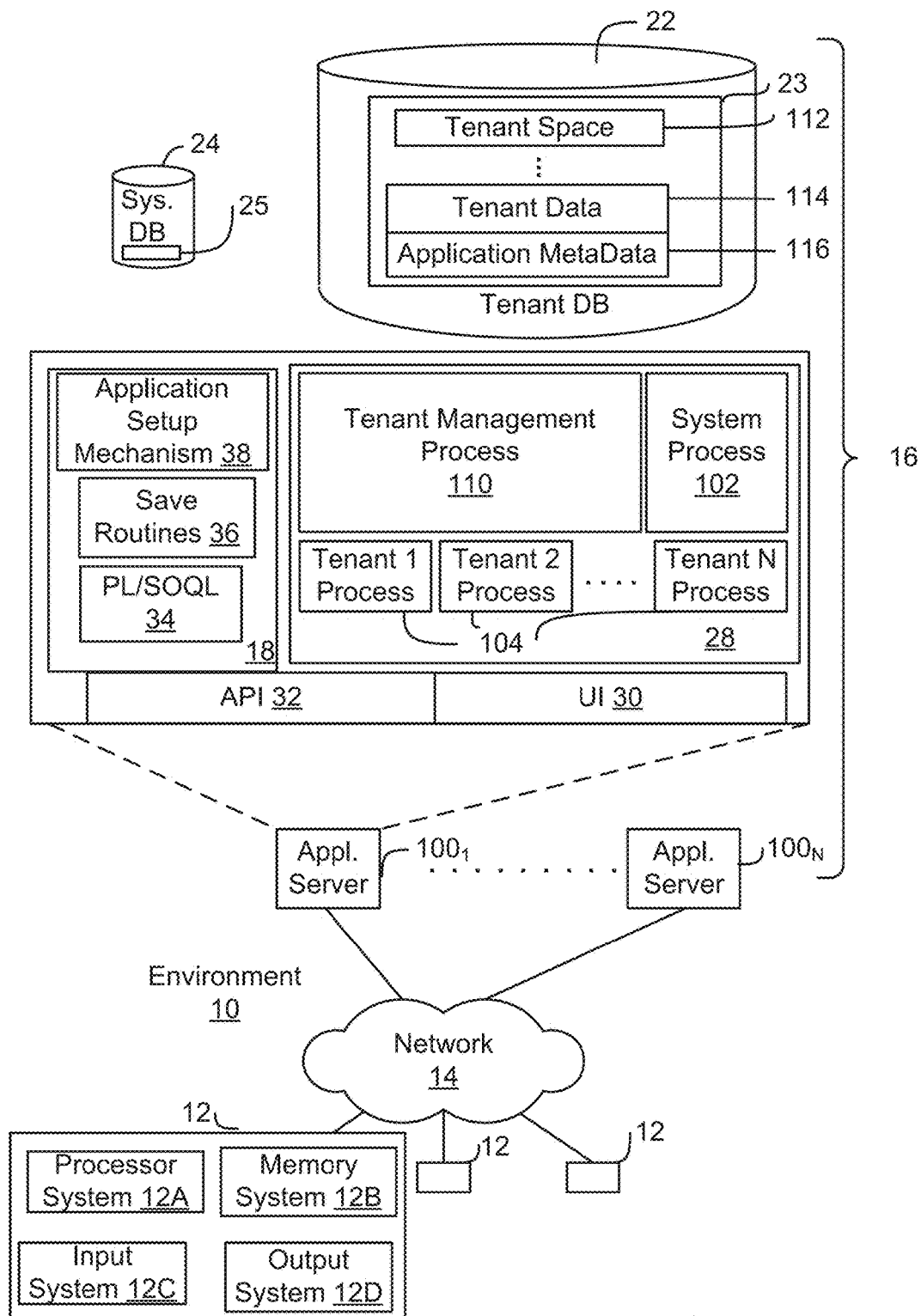
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2:
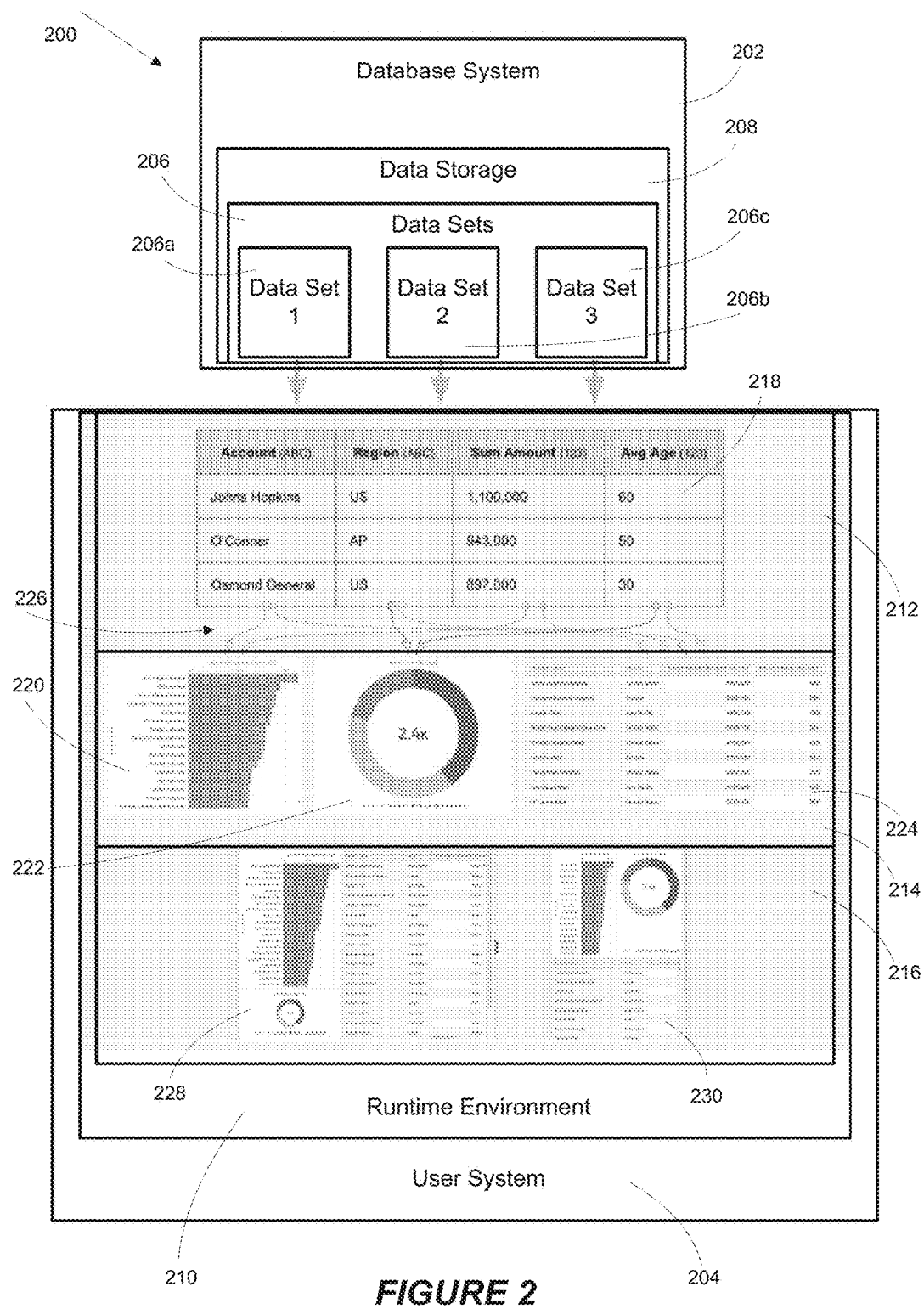
FIG. 2 shows an example environment in which a runtime environment can be implemented according to some implementations.

FIG. 2 shows an example environment 200 in which a runtime environment 210 can be implemented according to some implementations. The environment 200 may include a database system 202 and one or more user systems, such as user system 204, coupled to the database system 202. The one or more user systems (including the user system 204) may include one or more of the features of the user system 12 (FIG. 1A). The one or more user systems may be coupled to the database system 202 via a network (such as the network 14 (FIG. 1A)) and may communicate with the database system 202 via the network. The following description refers to user system 204 for clarity. However, it is to be understood that any of the one or more user systems may include one or more of the features of the user system 204.

The database system 202 may include one or more of the features of the database system 16 (FIG. 1A). The database system 202 may include one or more data sets 206. The data sets 206 may be stored within a data storage 208 of the database system 202. The data storage 208 may include a tenant data storage (such as the tenant data storage 22 (FIG. 1A)), a system data storage (such as the system data storage 24 (FIG. 1A)), or some combination thereof.

The data sets 206 may be accessible by the user system 204 and may include data provided to the database system 202 by the user system 204. The user system 204 may indicate which of the data sets 206 to which the data provided by the user system 204 should be added, may indicate that a new data set should be generated within the data sets 206 by the database system 202 for the data provided by the user system 204, may indicate a characteristic that may be used by the database system 202 to determine to which of the data sets 206 the data provided by the user system 204 should be stored, or some combination thereof. In some examples, each of the data sets 206 may be associated with a program, a file, a characteristic, or some combination thereof wherein the data stored in each of the data sets 206 is associated with the program, the file, the characteristic, or combination thereof, corresponding to the data set in which the data is stored.

In some examples, one or more of the data sets 206 may be stored in a different format from the other data sets. For example, the first data set 206a may be in SAQL format, the second data set 206b may be in SOQL format, and the third data set may be in open data protocol format. In other examples, the first data set 206a, the second data set 206b, and the third data set 206c may be in any file format for storing data in databases. Further, in some examples, one or more of the data sets 206 may be stored in a format corresponding to a program that generated the data. For example, the first data set 206a may be in a format corresponding to a first program, the second data set 206b may be in a format corresponding to a second program, and the third data set 206c may be in a format corresponding to a third program. In some examples, one or more of the data sets 206 may be incompatible with the other data sets within the data sets 206 without conversion of the format of the one or more data sets 206.

The user system 204 may implement a runtime environment 210 that may display the data from the data sets 206 in multiple different formats. The runtime environment 210 may receive at least a portion of the data stored in the data sets 206 from the database system 202. The runtime environment 210 may receive the portion of the data in response to one or more queries generated by the runtime environment 210 and transmitted to the database system 202. In some examples, the database system 202 may push the portion of the data to the runtime environment 210 in response to determining that a rule stored on the database system 202 indicates that the portion of the data is to be displayed within the runtime environment 210. Further, in some examples, the database system 202 may push additional data to the runtime environment 210 in response to determining that the additional data is related to the portion of the data previously transmitted to the runtime environment 210 and was stored in the data sets 206 after the portion of the data was transmitted. In some examples, the database system 202 may push the additional data to the runtime environment 210 in response to expiration of a predetermined interval of time after the portion of the data was previously transmitted to the runtime environment 210.

The runtime environment 210 may include multiple layers. Each of the layers may perform operations associated with the data received from the database system 202 independent of the other layers. Further, each of the layers may output results of the operations performed by the layer to an adjacent layer and the adjacent layer perform operations on the results provided to the adjacent layer.

In the illustrated example, the runtime environment 210 may include a data format layer 212 (which may be referred to as a "steps layer"), a data presentation generation layer 214 (which may be referred to as a "widgets layer"), and a layout generation layer 216 (which may be referred to as a "layouts layer"). For example, the data format layer 212 may independently perform operations on the data received from the database system 202 and may output the results of the operations to the data presentation generation layer 214, which is adjacent to the data format layer 212. It is to be understood that, in some examples, the runtime environment 210 may include more, less, or different layers than the three layers illustrated.

Further, in some examples, one or more of the layers of the runtime environment 210 may be implemented by the database system 202, while the rest of the layers of the runtime environment 210 may be implemented by the user system 204. For example, the data format layer 212 may be implemented by the database system 202, while the data presentation generation layer 214 and the layout generation layer 216 may be implemented by the user system 204.

The data format layer 212 may receive data from the database system 202 and generate a data agnostic data set 218 with the received data. The received data from the database system 202 may include data from the data sets 206. The received data from the database system 202 may be in one or more different formats.

The data agnostic data set 218 may store the received data in a single format. In some examples, the single format may be a comma-separated value format, although, it is to be understood that the single format can be any format for storing data. In instances that the received data, or some portion thereof, is not in the single format when received, the generation of the data agnostic data set 218 by the data format layer 212 may include converting the received data, or portion thereof, into the single format for inclusion in the data agnostic data set 218. Further, in some examples, the generation of the data agnostic data set 218 by the data format layer 212 may include arranging the received data for inclusion in the data agnostic data set 218.

Further, the data format layer 212 may query the database system 202 for data and/or transmit one or more requests for data to the database system 202. The data format layer 212 may generate the queries and/or requests based on information received from the data presentation generation layer 214 that may indicate the data, and/or categories of data, to be included in the data agnostic data set 218. In some examples, the categories of data to be included in the data agnostic data set 218 may be predetermined and the data format layer 212 may generate the queries and/or requests based on the categories.

The data presentation generation layer 214 may utilize the data within the data agnostic data set 218 to generate one or more data presentations, such as the first data presentation 220, the second data presentation 222, and the third data presentation 224. The data presentations may include visual presentations of the data that may be displayed on a user interface of the user system 204. The visual presentations of the data may include, but are not limited to, graphs, charts, tables, heat maps, other maps that display the data, or some combination thereof.

The data presentation generation layer 214 may utilize different portions of the data from the data agnostic data set 218 to generate the different data presentations. Further, the portion of the data utilized by the data presentation generation layer 214 to generate a first one of the data presentations may overlap with the portion of the data utilized by the data presentation generation layer 214 to generate a second one of the data presentations, such that both the first one of the data presentations and the second one of the data presentations present some of the same data. For example, the data presentation generation layer 214 may use the account data of the data agnostic data set 218 to generate the first data presentation 220 and the third data presentation 224 in the illustrated example. Arrows 226 may represent the data of the data agnostic data set 218 utilized by the data presentation generation layer 214 for the generation of each of the data presentations in the illustrated example.

The layout generation layer 216 may utilize the data presentations generated by the data presentation generation layer 214 to generate one or more user interface layouts to be displayed on the user interface of the user system 204. In the illustrated example, the user interface layouts may include the first user interface layout 228 and the second user interface layout 230. It is to be understood that the layout generation layer 216 may generate a single user interface layout that corresponds to the user system 204, however, the layout generation layer 216 is described herein as generating multiple user interface layouts to illustrate the capabilities of the layout generation layer 216. Further, in some examples, the user system 204 may be coupled to other user systems and the layout generation layer 216 may generate user interface layouts to be provided for display on the other user systems.

The layout generation layer 216 may generate each of the user interface layouts based on a type of the user system 204 that is to display the user interface layout, dimensions of a user interface on which the user interface layout is to be displayed, predetermined layout templates, or some combination thereof. In the illustrated example, the first user interface layout 228 may be generated for display on a desktop and/or laptop computer and the second user interface layout 230 may be generated for display on a cell phone. Each of the user interface layouts may be optimized for display based on the type of device, the dimensions of the user interface, the predetermined layout templates, or some combination thereof, such that a user viewing the user interface of the user system 204 is able to interpret the data represented by the data presentations within the user interface layout.

Each of the user interface layouts generated by the layout generation layer 216 may include the data presentations generated by the data presentation generation layer 214. In the illustrated example, both the first user interface layout 228 and the second user interface layout 230 may display the first data presentation 220, the second data presentation 222, and the third data presentation 224. The layout generation layer 216 may arrange and/or size the data presentations to be displayed in the user interface layouts based on the type of the user system 204, the dimensions of the user interface, the predetermined layout templates, or some combination thereof. For example, the first user interface layout 228 has the second data presentation 222 arranged in the bottom left corner for the desktop and/or laptop computer, while the second user interface layout 230 has the second data presentation 222 arranged in the top right corner for the cell phone.

In some examples, the layout generation layer 216 may include only a portion of the data presentations generated by the data presentation generation layer 214 in one or more of the user interface layouts. For example, one of the user interface layouts generated by the layout generation layer 216 may include the first data presentation 220 and the second data presentation 222, while another of the user interface layouts generated by the layout generation layer 216 may include the first data presentation 220, the second data presentation 222, and the third data presentation 224. The layout generation layer 216 may select the data presentations to be included in each of the user interface layouts and/or omit certain data presentations from each of the user interface layouts based on the type of the user system 204, the dimensions of the user interface, the predetermined layout templates, or some combination thereof.

The user system 204 may display the user interface layout that corresponds to the user system 204 on a user interface of the user system 204. The user interface layout may correspond to the user system 204 based on the type of the user system 204, the dimensions of the user interface of the user system 204, a predetermined layout associated with the user system 204, or some combination thereof.

The user system 204 may further detect user interactions with the user interface layout displayed on the user interface. The user interactions may include a cursor click, a touch of the user interface, other detectable user interactions with user interfaces known by one having ordinary skill in the art, or some combination thereof.

The user system 204 may detect a location of the user interaction with the user interface layout, a portion of the user interface layout corresponding to the location of the user interaction, or some combination thereof. The location of the user interaction may be indicated by x- and y-coordinates of the user interaction on the user interface. The portion of the user interface layout may include an indication of the data presentation and an element of the data presentation corresponding to the location of the user interaction. For example, the user system 204 may detect the location of the user interaction corresponds to one of the bars (i.e. the element) within the first data presentation 220 in the first user interface layout 228 displayed on the user interface.

In response to the detection of the user interaction, the user system 204 may identify and perform an operation (which may be referred to as "a binding" and which is described further throughout this disclosure) based on the location of the user interaction, the portion of the user interface layout corresponding to the location, or some combination thereof. The operation may include generating another data agnostic data set (such as the data agnostic data set 218), generating another data presentation (such as the first data presentation 220, the second data presentation 222, and/or the third data presentation 224), querying the database system 202 for data, updating the data agnostic data set 218, updating the first data presentation 220, the second data presentation 222 and/or the third data presentation 224, or some combination thereof. In some examples, the operation may include updating the first user interface layout 228, the second user interface layout 218, or some combination thereof.

The operation may be implemented by the data format layer 212, the data presentation generation layer 214, the layout generation layer 216, or some combination thereof. For example, the data presentation generation layer 214 may update the first data presentation 220, the second data presentation 222, and/or the third data presentation 224 in response to detecting the user interaction. Further, in some examples, the operation may include querying, by the user system 204, the database system 202 for data from the data sets 206 to update the data agnostic data set 218 and/or generate another data agnostic data set.

Figure 3:
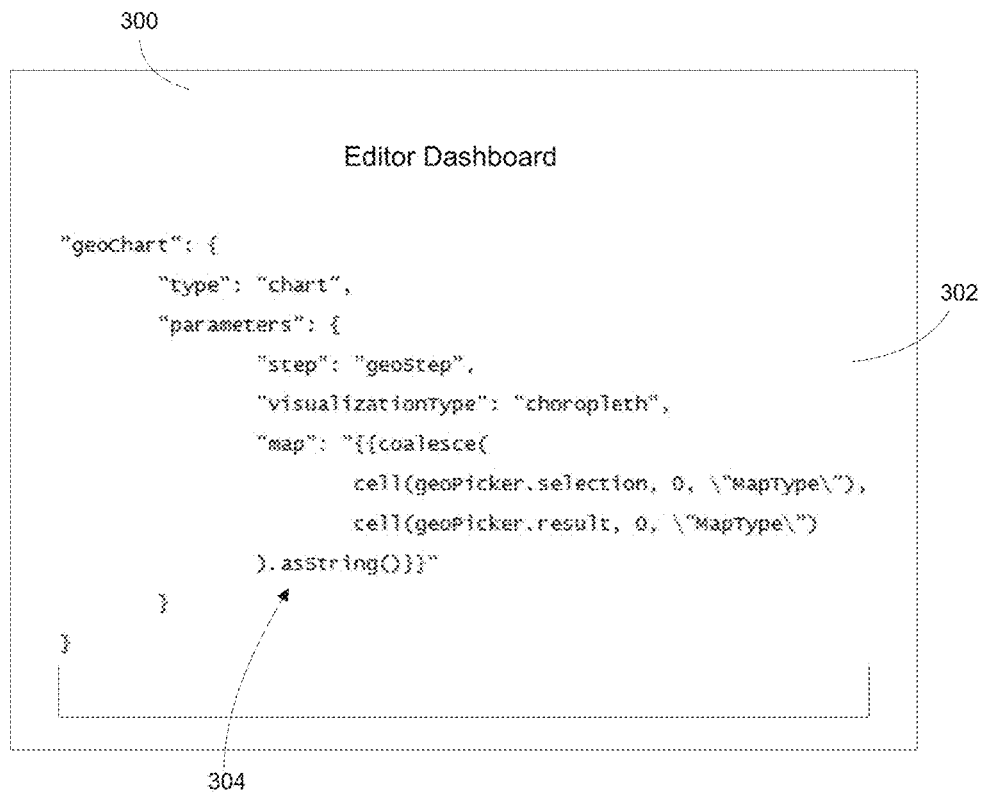
FIG. 3 shows an example editor dashboard according to some implementations.

FIG. 3 shows an example editor dashboard 300 according to some implementations. The runtime environment 210 (FIG. 2) may implement the editor dashboard 300. The runtime environment 210 may display the editor dashboard 300 as part of a user interface (such as the user interface 228 (FIG. 2) and/or the second user interface 230 (FIG. 2)), as an overlay of a user interface, as its own user interface, or some combination thereof. The runtime environment 210 may display the editor dashboard 300 in response to a user indication to enter an editor mode received via a user interface of the user system 204 (FIG. 2).

The editor dashboard 300 may be utilized by a user of the user system 204 to define an interactive dashboard of the runtime environment 210. The interactive dashboard may include a user interface (such as the first user interface 228 (FIG. 2) and the second user interface 230 (FIG. 2)). The interactive dashboard may be displayed on a user interface of the user system 204 and may be interacted with by a user of the user system 204. Defining the interactive dashboard may include defining the interactive dashboard, defining one or more portions of the interactive dashboard, defining one or more elements to be displayed within the interactive dashboard, defining an operation to be performed within the interactive dashboard, or some combination thereof. In some examples, defining the interactive dashboard may include generating on or more elements to be displayed within the interactive dashboard.

The editor dashboard 300 may include a script field 302. The script field 302 may receive a script entry 304 from a user of the user system 204. The user may input the script entry 304 into the script field 302 via the user interface of the user system 204. The runtime environment 210 may identify the script entry 304 input into the script field 302 and may parse the script entry 304. The runtime environment 210 may identify an operation to be performed within the interactive dashboard based on the parsing of the script entry 304. Further, in some examples, the runtime environment 210 may identify portions of the script entry 304 that define characteristics and/or appearance of the user interface, or portions thereof, to be displayed on the interactive dashboard.

The runtime environment 210 may further identify a trigger event to trigger performance of the operation based on the parsing of the script entry 304. The trigger event may be user defined within the script entry 304. The trigger event may include a user interaction with a user interface displayed on the interactive dashboard, initiation of a data query by the runtime environment 210, receipt of data from the database system 200 (FIG. 2), performance of another operation, loading of the interactive dashboard for display within runtime environment 210, or some combination thereof. In some examples where the runtime environment 210 includes multiple different interactive dashboards, the runtime environment 210 may identify the interactive dashboard to which the operation is to be associated and/or assigned based on the parsing of the script entry 304.

In examples where the runtime environment 210 identifies an operation to be performed within the interactive dashboard, the runtime environment 210 may generate a syntax tree as part of the parsing of the script entry. The runtime environment 210 may generate one or more nodes for the syntax tree. The runtime environment 210 may step through the nodes of the syntax tree to perform the operation.

The runtime environment 210 may associate and/or assign the operation with the interactive dashboard. Associating and/or assigning the operation with the interactive dashboard may include associating the syntax tree with the interactive dashboard and/or assigning the syntax tree to the interactive dashboard. The runtime environment 210 may perform the operation within the interactive dashboard in response to the trigger event based on the operation being associated with the interactive dashboard and/or assigned to the interactive dashboard. Performance of the operation may include performance of the nodes of the syntax tree in response to the trigger event. The runtime environment 210 may step through the nodes of the syntax tree and perform each node to complete the operation.

Figure 4:
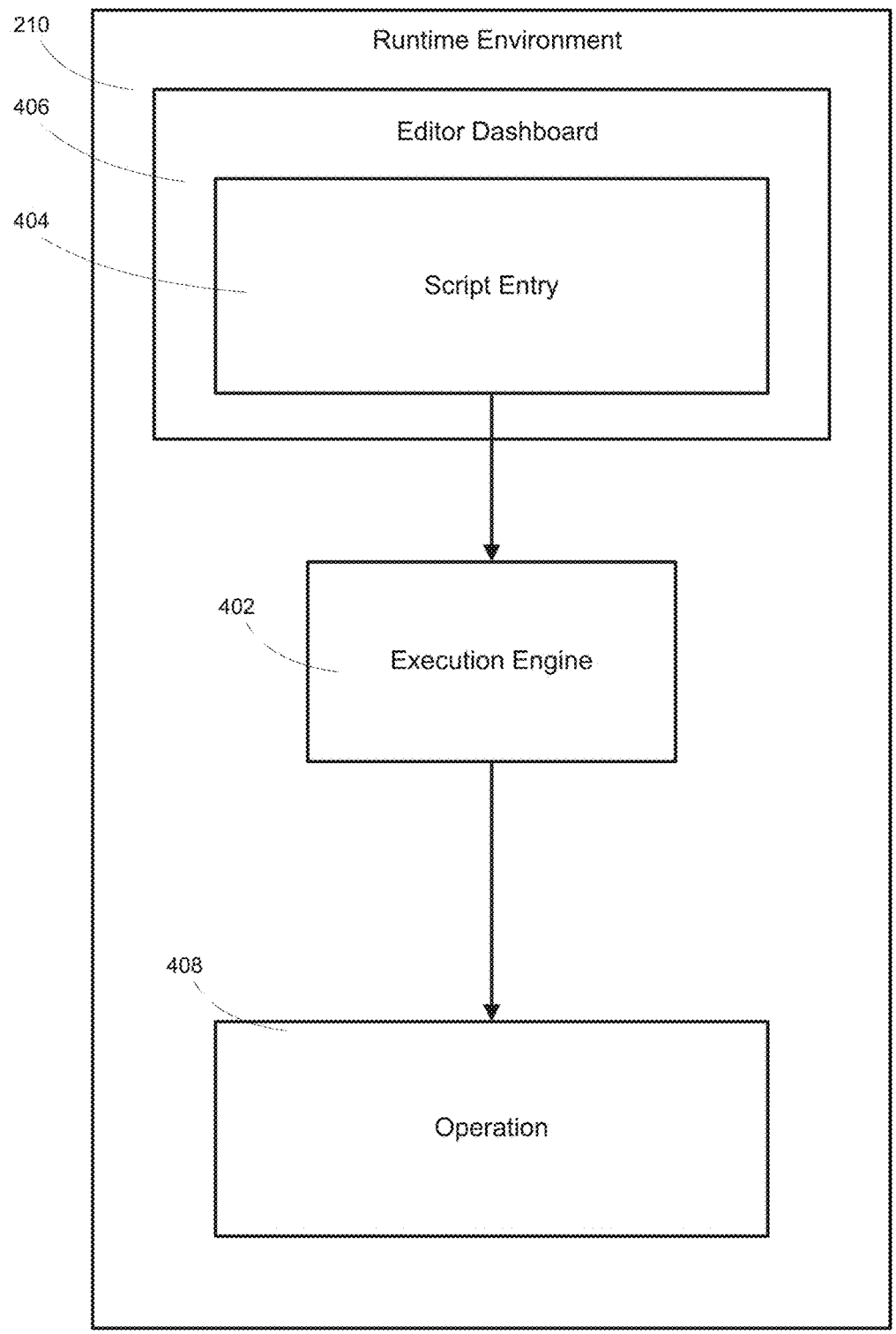
FIG. 4 shows an example execution engine according to some implementations.

FIG. 4 shows an example execution engine 402 according to some implementations. The execution engine 402 may be included within the runtime environment 210 (FIG. 2). The execution engine 402 may include one or more stored sequences of instructions that, when executed by a processor, cause a processor to perform one or more operations.

The execution engine 402 may receive a script entry 404 from an editor dashboard 406. The script entry 404 may include one or more of the features of the script entry 304 (FIG. 3), and the editor dashboard 406 may include one or more of the features of the editor dashboard 300 (FIG. 3).

The execution engine 402 may parse the script entry 404 and generate an operation 408. The operation 408 may include one or more operations to be performed by the runtime environment 210 within an interactive dashboard being displayed by the runtime environment 210. The execution engine 402 may further define a trigger event to trigger performance of the operation 408 based on the script entry 404.

In some examples, the script entry 404 may be in a first computer language and the execution engine 402 may convert the script entry 404 into a second computer language to generate the operation 408. The first computer language may be a proprietary computer language associated with the runtime environment. For example, the execution engine 402 may receive the script entry in the proprietary computer language and convert the script entry into JavaScript code to generate the operation 408. The performance of the operation 408 may include performance of the JavaScript code. In some examples, the runtime environment may be implemented within a browser of the user system 204 and the browser may implement the JavaScript code to perform the operation 408.

The operation 408 may include one or more operations to be performed by the data format layer 212 and/or the data presentation generation layer 214 within the interactive dashboard. The operation 408 may include generating another data agnostic data set (such as the data agnostic data set 218 (FIG. 2)), generating another data presentation (such as the first data presentation 220 (FIG. 2), the second data presentation 222 (FIG. 2), and/or the third data presentation 224 (FIG. 2)), querying the database system 202 (FIG. 2) for data, updating a data agnostic data set (such as the data agnostic data set 218 (FIG. 2)), updating a data presentation (such as the first data presentation 220 (FIG. 2), the second data presentation 222 (FIG. 2) and/or the third data presentation 224 (FIG. 2)), or some combination thereof.

In some examples, the operation may include defining (via updating and/or generating) one or more data presentations, portions of one or more data presentations, or some combination thereof. In some instances, the definition of the data presentations and/or portions may be based on the data returned by the database system 202 in response to a query, data within the data agnostic data set, or some combination thereof. For example, the operation may define that a first type of data presentation should be utilized for displaying the data if the data corresponds to a first characteristic and a second type of data presentation should be utilized for displaying the data if the data corresponds to a second characteristic. For a particular example, the operation may define that, if the data corresponds only to the United States, the data presentation should be a heat map displaying only the United States and, if the data corresponds to multiple locations around the World, the data presentation should be a heat map displaying the World.

Further, in some instances, the operation may define that different portions and/or elements should be displayed in different formats based on the data returned by the database system 202 in response to a query, data within the data agnostic data set, or some combination thereof. For example, the operation may define that a first portion of text, from the data, corresponding to a first characteristic should be displayed in a first format in a data presentation and a second portion of text, from the data, corresponding to a second characteristic should be displayed in a second format in the data presentation. For a particular example, the operation may define that a first portion of text, to be included in a data presentation, that corresponds to a book title should be displayed underlined in the data presentation and a second portion of the text, to be included in the data presentation, that corresponds to a person's name should be displayed bolded in the data presentation.

Further, in some instances, the operation may include changing a type of data presentation in response to a trigger event. For example, the operation may change a first type of data presentation displayed on the user interface to a second type of data presentation in response to the trigger. For a particular example, the operation may change a bar graph into a pie chart in response to a user clicking on a portion of the display (such as a button, the bar graph, or some other portion of the display).

The generation of the operation 408 by the execution engine 402 is described further throughout this disclosure. For example, the execution engine 402 may generate the syntax tree 600 (FIG. 6) based on the script entry 504 (FIG.

5), wherein performance of the operation 408 may include performing the nodes within the syntax tree 600.

Figure 5:
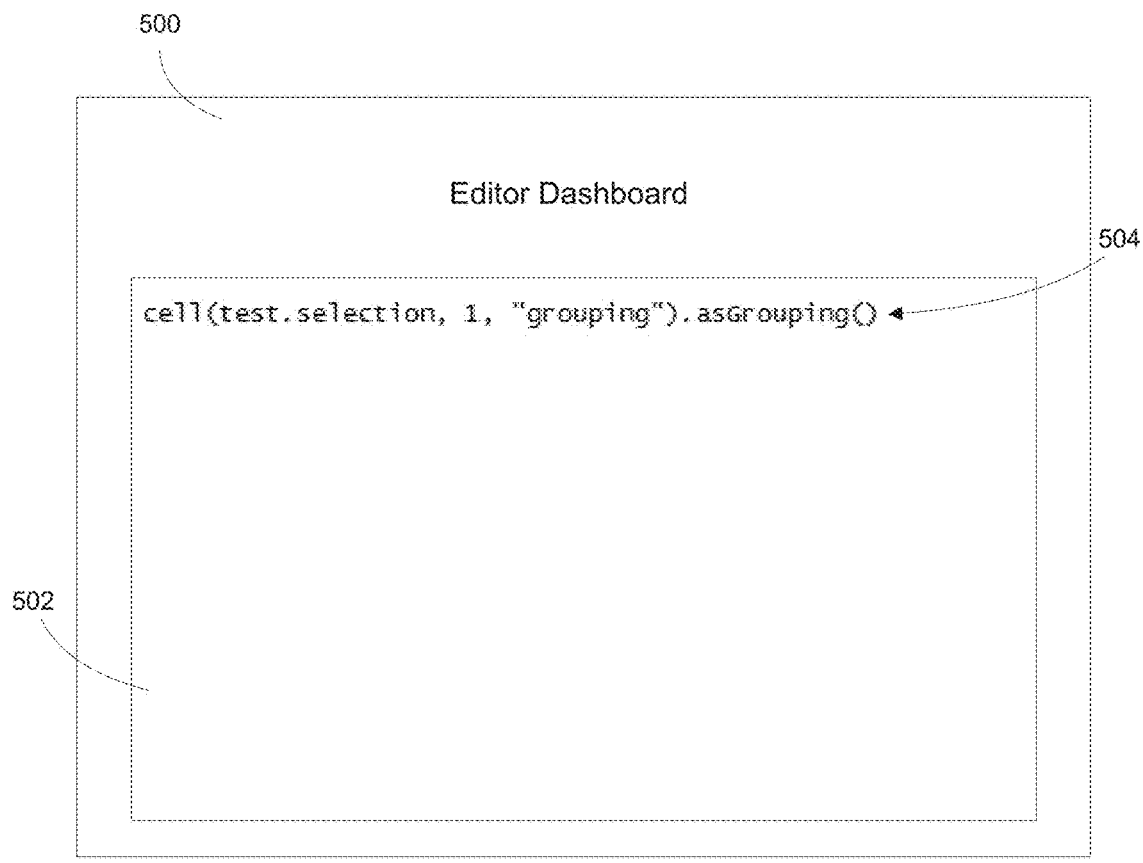
FIG. 5 shows another example editor dashboard according to some implementations.

FIG. 5 shows another example editor dashboard 500 according to some implementations. The editor dashboard 500 may include one or more the features of the editor dashboard 300 (FIG. 3).

The editor dashboard 500 may include a script field 502. The script field 502 may include a script entry 504, which may have been input by a user of the user system 204 (FIG. 2) displaying the editor dashboard 500. In the illustrated example, the script entry 504 is an example of simplified script entry that is being utilized to illustrate some of the features that may be implemented by the runtime environment 210 (FIG. 2). In the illustrated example, the script entry 504 may define an operation that returns a grouping as a string for a query. The query may include a query for data from one or more of the data sets 206 (FIG. 2) of the database system 202 (FIG. 2) by the runtime environment 210.

Figure 6:
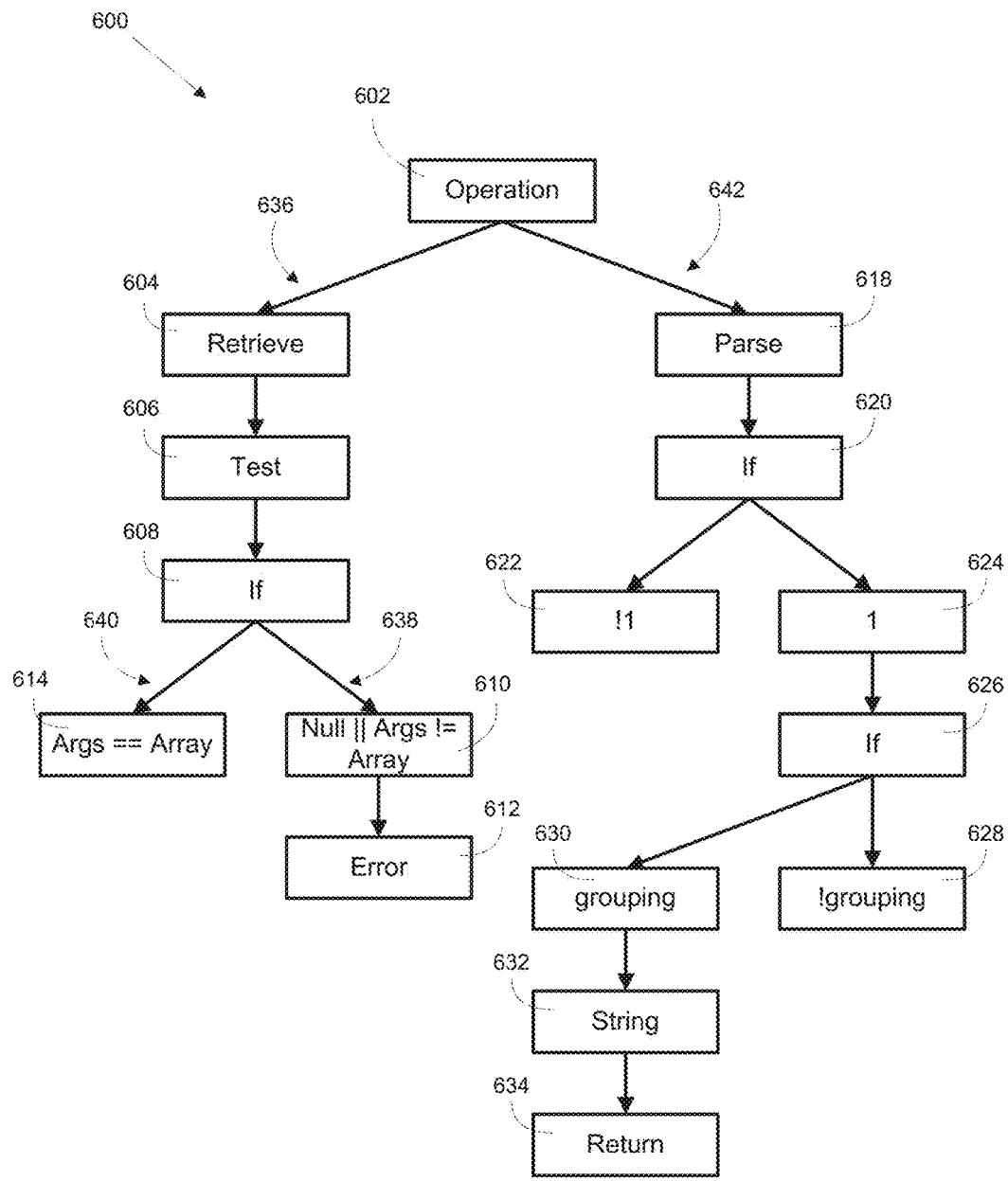
FIG. 6 shows an example syntax tree for the script entry of FIG. 5 according to some implementations.

FIG. 6 shows an example syntax tree 600 for the script entry 504 of FIG. 5 according to some implementations. The syntax tree 600 may be generated by the runtime environment 210 (FIG. 2). In particular, the execution engine 402 (FIG. 4) of the runtime environment 210 may generate the syntax tree 600. Further, the runtime environment 210 may perform the syntax tree 600 within an interactive dashboard in response to a trigger event associated with the script entry 504.

It is to be understood that the syntax tree 600 is an example of a syntax tree and the syntax tree implemented by the runtime environment 210 (FIG. 2) may be any type of syntax tree known by one having ordinary skill in the art. Further, an order of stepping through the nodes of syntax tree 600 is described below, although, it is to be understand that the order of stepping through the nodes of the syntax tree 600 is an example order and other examples may include any order of stepping through the syntax tree 600.

Node 602 may be an initiation point for an operation associated with the script entry 504. From the node 602, the operation may progress along a first branch 636 to node 604.

In the node 604, the runtime environment 210 may perform a query. The runtime environment 210 may query for data labeled 'test', as indicated by node 606. To perform the query, the runtime environment 210 may query the data sets 206 (FIG. 2) of the database system 202 (FIG. 2) for the data labeled 'test'. In response to the query, the database system 200 may return the data labeled 'test' to the runtime environment 210. If the data sets 206 of the database system 200 do not include data labeled 'test', the database system 200 may return a 'null' indicator to the runtime environment 210.

The operation may progress to node 608, wherein an if statement is performed. The operation may progress along a first if branch 638 to node 610. In node 610, the runtime environment 210 may determine if the value returned by the database system 202 is a 'null' indicator or if the arguments within the data labeled 'test' is not an array. In particular, the operation of the illustrated syntax tree 600 may take an array as an input. In response to the runtime environment 210 determining that the value is a 'null' indicator or not an array, the runtime environment 210 may progress to node 612, where the runtime environment 210 displays an error message on the user interface of the user system 204 (FIG. 2). The runtime environment 210 may terminate the operation represented by the syntax tree 600 in response to displaying the error message.

If the runtime environment 210 determines that the value is not a 'null' indicator or is an array in node 610, the operation may progress along a second if branch 640 to node 614. In node 614, the runtime environment 210 may verify that the arguments within the data labeled 'test' is an array. The operation may return to node 602, where the operation may progress along a second branch 642 to node 618.

In node 618, the runtime environment 210 may parse the arguments within the data labeled 'test' to identify each separate argument.

The operation may progress to node 620, where an if statement is performed. The if statement may step through the arguments to determine whether each of the arguments are within a row labeled '1' within the data labeled 'test'. If the argument being tested by the if statement is not within the row labeled '1', the operation may progress to node 622, where the argument is ignored. If the argument being tested by the if statement is within the row labeled '1', the operation may progress to node 624.

From node 624, the operation may progress to node 626, where another if statement is performed. The if statement may step through the arguments determined by if statement of node 620 to be within the row labeled '1' to determine whether the arguments are associated with a 'grouping' label. If the argument being tested by the if statement is not associated with the 'grouping' label, the operation may progress to node 628, wherein the argument is ignored. If the argument being tested by the if statement is associated with the 'grouping' label, the operation may progress to node 630.

From node 630, the operation may progress to node 632. In node 632, the runtime environment 210 may transform the arguments determined to be associated with the 'grouping' label by the if statement of node 626 to strings.

The operation may progress from node 632 to node 634. In node 634, the runtime environment 210 may return the strings as an output of the operation.

Figure 7:
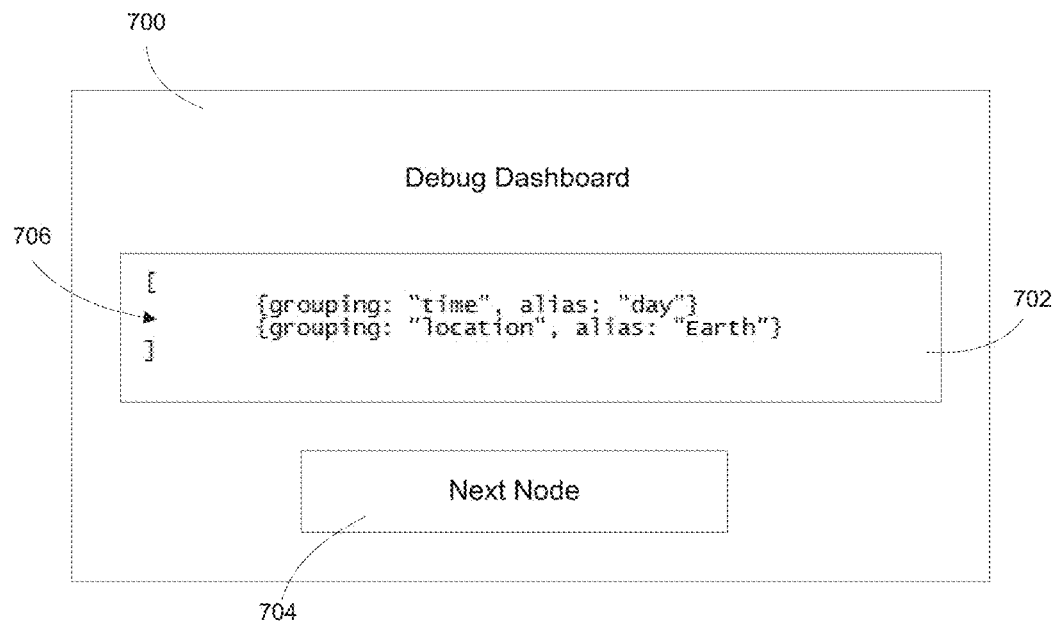
FIG. 7 shows an example debug dashboard displaying results of performance of a node of the syntax tree of FIG. 6 according to some implementations.

FIG. 7 through FIG. 10 illustrate an example debug operation associated with the script entry 504 (FIG. 5) within a debug dashboard 700 (FIG. 7). In particular, the debug operation may include stepping through nodes of the syntax tree 600 (FIG. 6) and displaying results of one or more of the nodes of the syntax tree 600 within the debug dashboard 700. Performance of the debug operation may allow a user of the user system 204 (FIG. 2) to determine whether the script entry 504 input by the user is performing the operation or operations intended by the user.

The debug dashboard 700 may be displayed by the runtime environment 210 (FIG. 2) on a user interface of the user system 204 in response to a user request to debug a script entry (such as the script entry 304 (FIG. 3) and/or the script entry 504) input into a script field (such as the script field 302 (FIG. 3) and/or the script field 502 (FIG. 5)). The runtime environment 210 may display the debug dashboard 700 as part of a user interface (such as the user interface 228 (FIG. 2) and/or the second user interface 230 (FIG. 2)), as an overlay of a user interface, as its own user interface, or some combination thereof. Further, the runtime environment 210 may display the debug dashboard 700 within an editor dashboard (such as the editor dashboard 500 (FIG. 5)), within an interactive dashboard, as a stand-alone dashboard, or some combination thereof.

FIG. 7 shows the example debug dashboard 700 displaying results of performance of a node of the syntax tree 600 of FIG. 6 according to some implementations. The debug dashboard 700 may include a result display 702. The result display 702 may display a result of the performance of a node of the syntax tree 600. The debug dashboard 700 may further include a button 704 for stepping through nodes of the syntax tree 600. The results display 702 may be updated with the results of the next node within the syntax tree 600, or the next node that causes a change to the results displayed within the results display 702, in response to a user interaction with the button 704.

In some examples, the button 704 may be omitted and another user interaction (such as clicking on the debug dashboard 700, clicking on the result display 702, any other user interaction with the user interface of the user system 204 (FIG. 2), or some combination thereof) may cause the nodes of the syntax tree 600 to be stepped through and the results display 702 to change accordingly. It is to be understood that description of actions being caused by user interaction with the button 704 throughout this disclosure may be caused by the other user interaction, which causes the nodes of the syntax tree 600 to be stepped through, in some examples.

In the illustrated example, the result display 702 may display a result of the performance of the node 614 (FIG. 6) of the syntax tree 600. In particular, the results display 702 may display array 706 that corresponds to the data labeled 'test'. The runtime environment 210 (FIG. 2) may perform node 604 (FIG. 6), node 606 (FIG. 6), node 608 (FIG. 6), and node 614 (FIG. 6) of the syntax tree 600 in response to a request to enter the debug mode, an initial user interaction with the button 704, or some combination thereof. The runtime environment 210 may receive the array 706 from the database system 202 and cause the debug dashboard 700 to be displayed with the array 706 within the result display 702.

The runtime environment 210 may detect a user interaction with the button 704 while the array 706 is displayed within the result display 702. In response to detecting the user interaction, the runtime environment 210 may perform one or more subsequent nodes in the flow of the syntax tree 600. The runtime environment 210 may update the debug dashboard 700 as described further in relation to FIG. 8.

Figure 8:
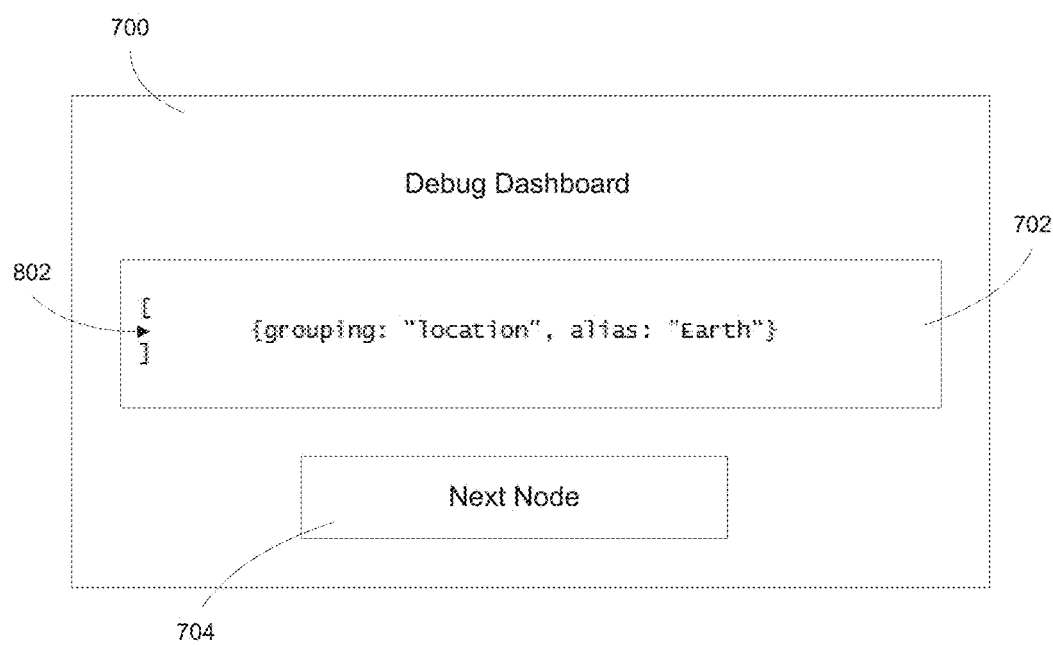
FIG. 8 shows the example debug dashboard of FIG. 7 displaying results of performance of another node of the syntax tree of FIG. 6 according to some implementations.

FIG. 8 shows the example debug dashboard 700 of FIG. 7 displaying results of performance of another node of the syntax tree of FIG. 6 according to some implementations. The example of the debug dashboard 700 illustrated in FIG. 8 may have been displayed in response to the user interaction with the button 704 in the example of the debug dashboard 700 illustrated in FIG. 7.

In response to the runtime environment 210 detecting the user interaction with the button 704 while the array 706 was displayed (described in relation to FIG. 7), the runtime environment 210 may perform node 618, node 620, node 622, and node 624. The runtime environment 210 may produce array 802 in response to performing the nodes. In particular, the runtime environment 210 may determine which arguments are located in the row labeled '1' of the array 706 and produce array 802 that illustrates the argument located in the row labeled '1'. Further, the runtime environment 210 may cause the debug dashboard 700 to be updated to display the array 802 within the result display 702.

The runtime environment 210 may detect a user interaction with the button 704 while the array 802 is displayed within the result display 702. In response to detecting the user interaction, the runtime environment 210 may perform one or more subsequent nodes in the flow of the syntax tree 600. The runtime environment 210 may update the debug dashboard 700 as described further in relation to FIG. 9.

Figure 9:
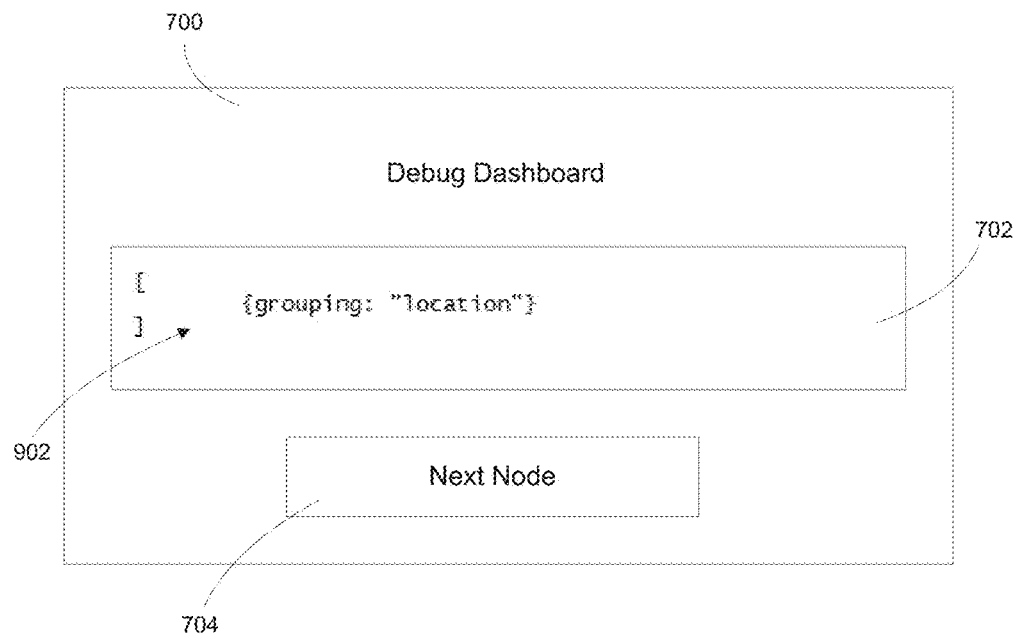
FIG. 9 shows the example debug dashboard of FIG. 7 displaying results of performance of another node of the syntax tree of FIG. 6 according to some implementations.

FIG. 9 shows the example debug dashboard 700 of FIG. 7 displaying results of performance of another node of the syntax tree 600 of FIG. 6 according to some implementations. The example of the debug dashboard 700 illustrated in FIG. 9 may have been displayed in response to the user interaction with the button 704 in the example of the debug dashboard 700 illustrated in FIG. 8.

In response to the runtime environment 210 detecting the user interaction with the button 706 while the array 802 was displayed (described in relation to FIG. 8), the runtime environment 210 may perform node 626, node 628, and node 630. The runtime environment 210 may produce array 902 in response to performing the nodes. In particular, the runtime environment 210 may determine which arguments are associated with a 'grouping' label of the array 802 and produce the array 902 that illustrates the arguments associated with the 'grouping' label. Further, the runtime environment 210 may cause the debug dashboard 700 to be updated to display the array 902 within the result display 702.

The runtime environment 210 may detect a user interaction with the button 704 while the array 902 is displayed within the result display 702. In response to detecting the user interaction, the runtime environment 210 may perform one or more subsequent nodes in the flow of the syntax tree 600. The runtime environment 210 may update the debug dashboard 700 as described further in relation to FIG. 10.

Figure 10:
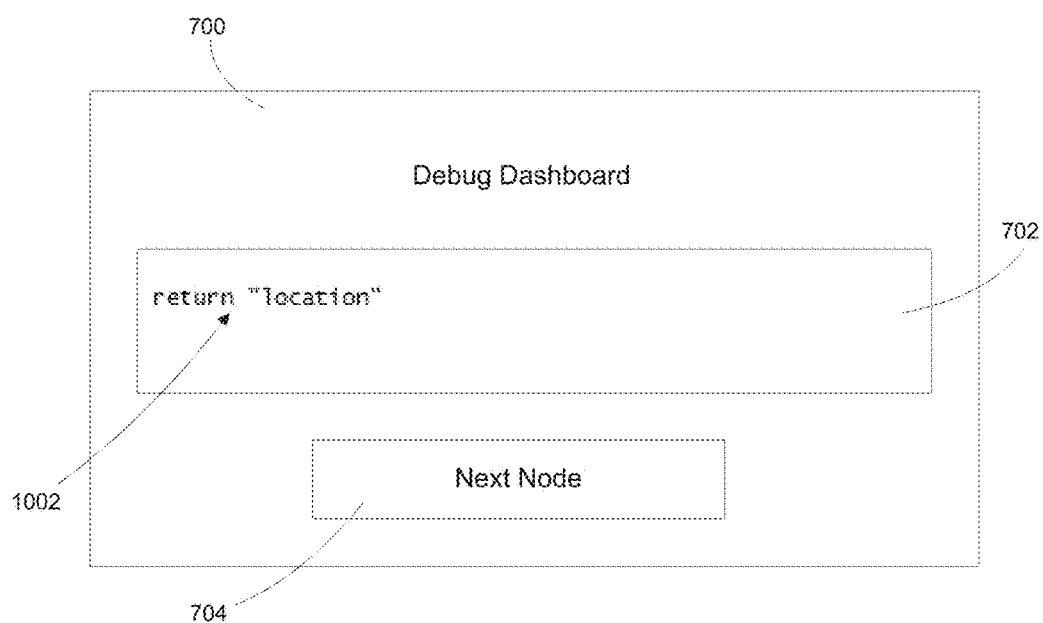
FIG. 10 shows the example debug dashboard of FIG. 7 displaying results of performance of another node of the syntax tree of FIG. 6 according to some implementations.

FIG. 10 shows the example debug dashboard 700 of FIG. 7 displaying results of performance of another node of the syntax tree of FIG. 6 according to some implementations. The example of the debug dashboard 700 illustrated in FIG. 10 may have been displayed in response to the user interaction with the button 704 in the example of the debug dashboard 700 illustrated in FIG. 9.

In response to the runtime environment 210 detecting the user interaction with the button 706 while the array 902 was displayed (described in relation to FIG. 9), the runtime environment 210 may perform node 632 and node 634. The runtime environment 210 may produce return value 1002 in response to performing the nodes. In particular, the runtime environment 210 may identify the string associated with the 'grouping' label within the array 902 and produce the return value 1002. In particular, the return value 1002 may indicate that runtime environment 210 returns the string "location" in response to performing the operation produced from the script entry 504.

Figure 11:
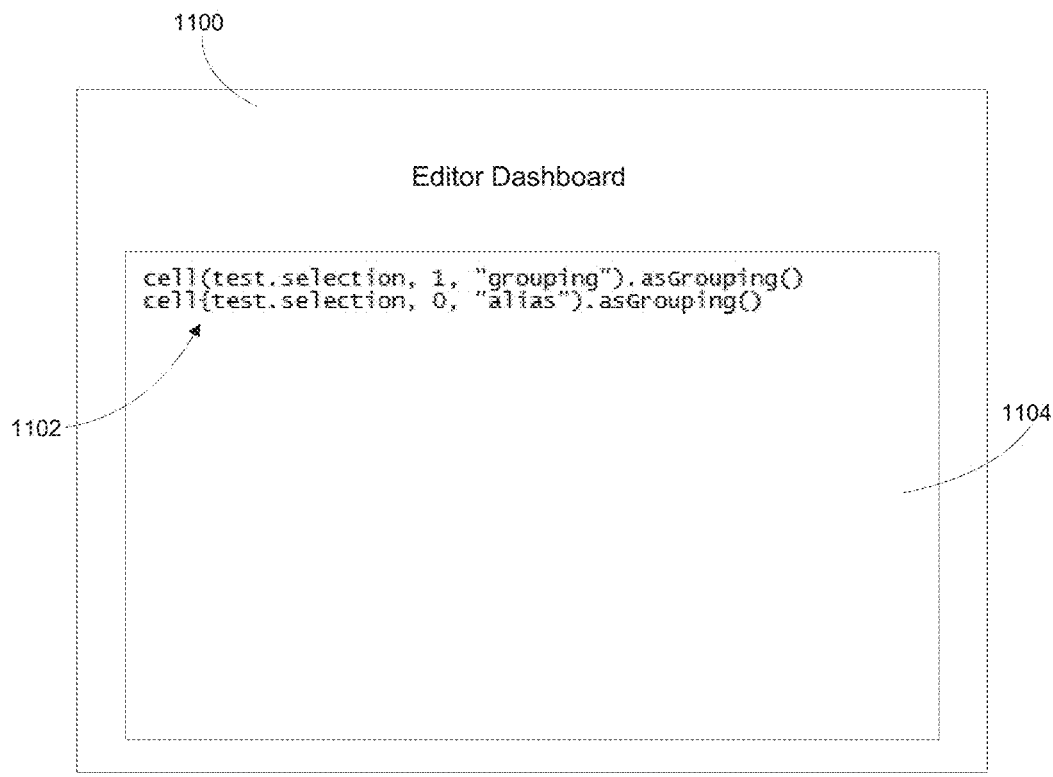
FIG. 11 shows an example editor dashboard with an improper script entry according to some implementations.

FIG. 11 shows an example editor dashboard 1100 with an improper script entry 1102 according to some implementations. The editor dashboard 1100 may include one or more of the features of the editor dashboard 300 (FIG. 3), and the improper script entry 1102 may include one or more of the features of the script entry 304 (FIG. 3). The runtime environment 210 (FIG. 2) may display the editor dashboard 1100 on a user interface of the user system 204 (FIG. 2).

The editor dashboard 1100 may include a script field 1104, which may include the improper script entry 1102. The improper script entry 1102 may have been input into the script field 1104 by a user via the user interface of the user system 204. The improper script entry 1102 may have an improper syntax. In particular, the '{' at the fifth character of the second line of the improper script entry 1102 may be improper syntax for the 'cell( )' function call.

The execution engine 402 (FIG. 4) of the runtime environment 210 may receive the improper script entry 1102 and attempt to generate an operation from the improper script entry 1102. The execution engine 402 may parse the improper script entry 1102 and analyze the improper script entry 1102 for improper syntax, security threats, validation issues, business logic errors, or some combination thereof. In response to identifying an improper syntax, a security threat, a validation issue, and/or a business logic error, the runtime environment 210 may cause an error message within the editor dashboard 1100 (as described further in relation to FIG. 12) and/or provide an indication of the improper syntax, the security threat, the validation issue, and/or the business logic error. Further, the runtime environment 210 may prevent performance of an operation associated with the improper script entry 1102 in response to identifying the improper syntax, the security threat, the validation issue, and/or the business logic error. In some examples, the execution engine 402 may correct at least some instances of improper syntax, security threats, validation issues, and/or business logic errors.

Figure 12:
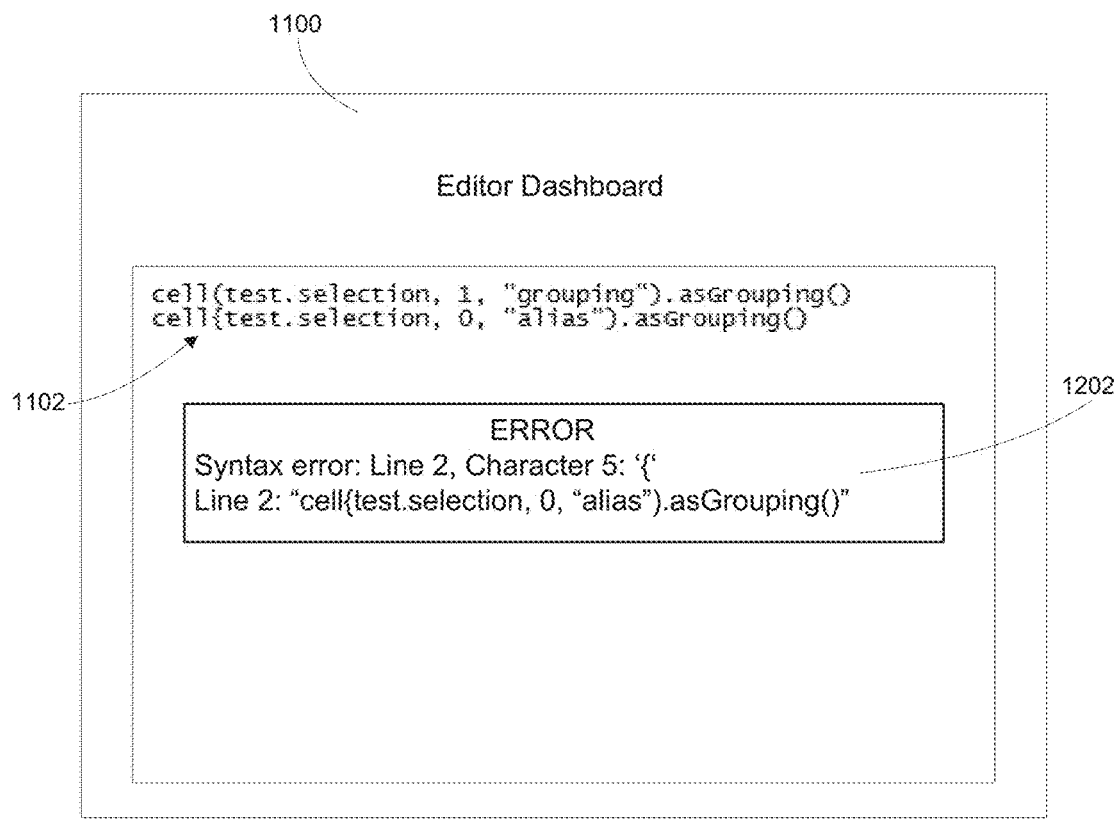
FIG. 12 shows the example editor dashboard of FIG. 11 with error display according to some implementations.

FIG. 12 shows the example editor dashboard 1100 of FIG. 11 with error display 1202 according to some implementations. The runtime environment 210 (FIG. 2) may have caused the error display 1202 to be displayed within the editor dashboard 1100 in response to the execution engine 402 (FIG. 4) identifying an improper syntax, a security threat, a validation issue, and/or a business logic error within the improper script entry 1102.

The error display 1202 may indicate that an error exists in the improper script entry 1102, the type of the error, a location of the error, the portion of the improper script entry 1102 that includes the error, provide a suggestion for correcting the error, or some combination thereof. In the illustrated example, the execution engine 402 may have identified a syntax error of the '{' at line 2, character 5 of the improper script entry 1102. The error display 1202 may display the location of the '{' and the line of the improper script entry 1102 that includes the error.

Figure 13:
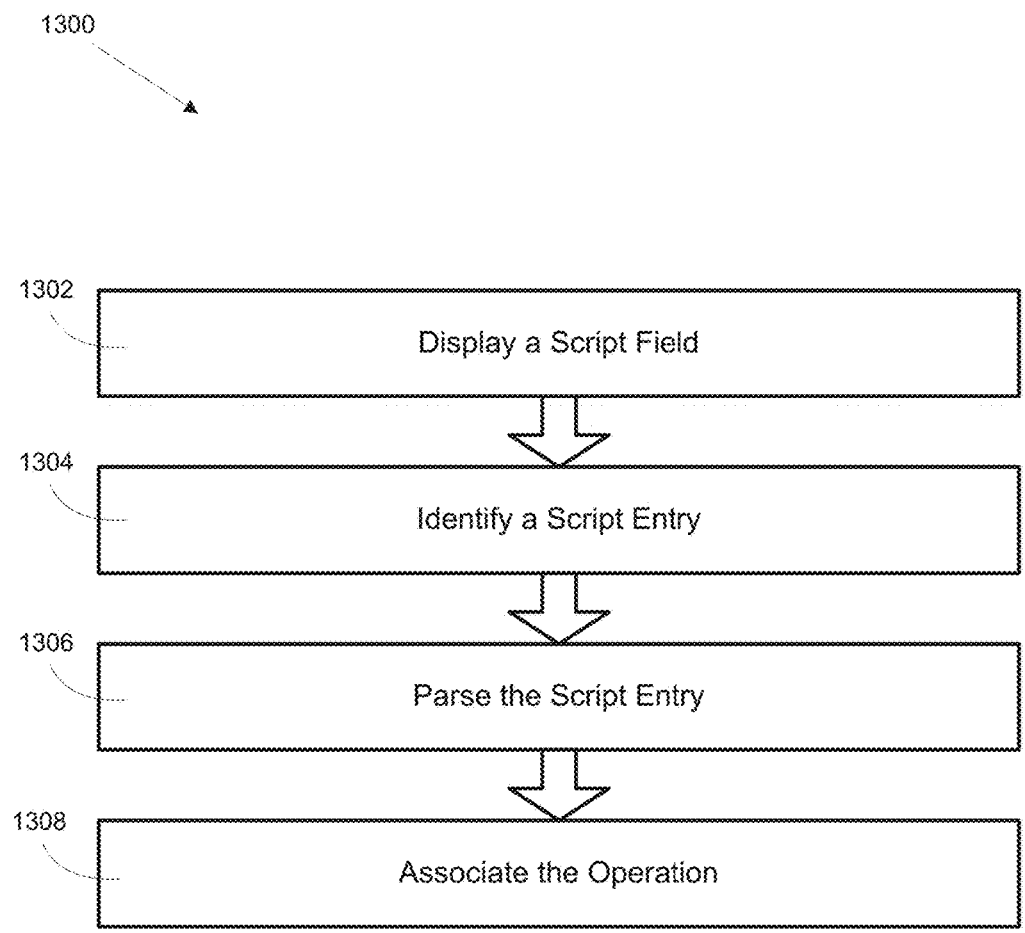
FIG. 13 shows a procedure of associating an operation according to some implementations.

FIG. 13 shows a procedure 1300 of associating an operation according to some implementations. The procedure 1300 may be performed by the runtime environment 210 (FIG. 2). In particular, the execution engine 402 (FIG. 4) of the runtime environment 210 may perform the procedure 1300.

In stage 1302, the runtime environment 210 may display a script field within an editor dashboard of the runtime environment 210. The editor dashboard may include one or more of the features of the editor dashboards described throughout this disclosure, such as the editor dashboard 300 (FIG. 3) and/or the editor dashboard 500 (FIG. 5). The runtime environment 210 may display the editor dashboard on a user interface of a user system, such as the user system 204 (FIG. 2). The editor dashboard may be configured to define an interactive dashboard of the runtime environment 210. The interactive dashboard may include one or more of the features of the interactive dashboards described throughout this disclosure, such as the first user interface layout 228 (FIG. 2) and/or the second user interface layout 230 (FIG. 2).

In stage 1304, the runtime environment 210 may identify a script entry input into the script field. The script entry may be input into the script field by a user of the user system via a user interface of the user system. The script entry may include one or more of the features of the script entries described throughout this disclosure, such as the script entry 304 (FIG. 3), the script entry 404 (FIG. 4), the script entry 504 (FIG. 5), and/or the improper script entry 1102 (FIG. 11).

In stage 1306, the runtime environment 210 may parse the script entry to identify an operation to be performed within the interactive dashboard. The operation may be configured to be performed in response to a trigger event. The operation may include one or more of the features of the operation described throughout this disclosure, such as the operation 408 (FIG. 4).

Parsing the script entry may further include generation of a syntax tree for the operation. The syntax tree may include one or more of the features of the syntax trees described throughout this disclosure, such as the syntax tree 600 (FIG. 6). Further, the generation of the syntax tree may include one or more of the features of generation of syntax trees described throughout this disclosure.

Further, in some examples, parsing the script entry may include analyzing the script entry for improper syntax, security threats, validation issues, and/or business logic errors. Analyzing the script entry may include one or more of the features of analyzing script entries described throughout this disclosure. In response to identifying an improper syntax, a security threat, a validation issue, and/or a business logic error, the runtime environment 210 may display an error message. The error message may include one or more of the features of error messages described throughout this disclosure, such as the error display 1202 (FIG. 12).

In stage 1308, the runtime environment 210 may associate the operation with the interactive dashboard and/or assign the operation to the interactive dashboard. Association of the operation with the interactive dashboard and/or assignment of the operation with the interactive dashboard may cause the operation to be performed within the interactive dashboard. The operation may be performed in response to the trigger event based on the association and/or assignment.

In some examples, the association of the operation with the interactive dashboard and/or assignment of the operation with the interactive dashboard may further include association of the syntax tree with the interactive dashboard and/or assignment of the syntax tree to the interactive dashboard. The performance of the operation may include performing the nodes of the syntax tree within the interactive dashboard. The runtime environment 210 may perform the nodes of the syntax tree in response to the trigger event.

Figure 14:
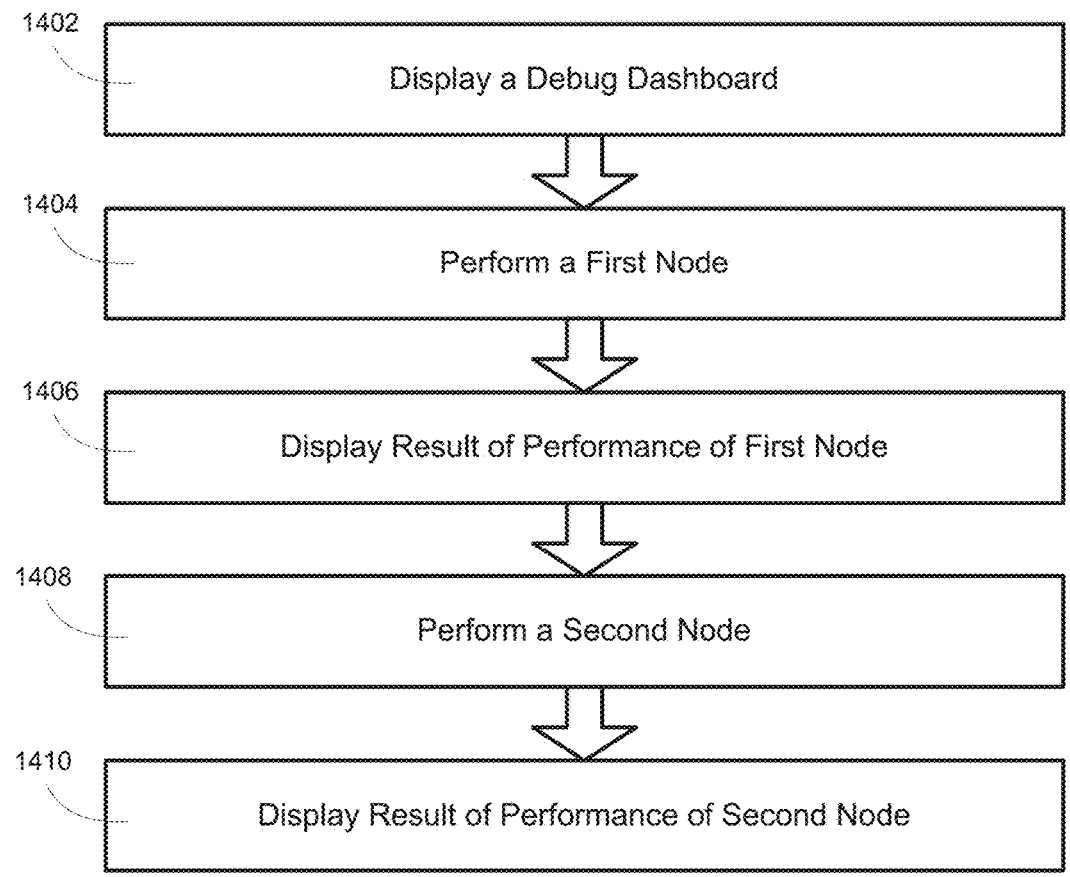
FIG. 14 shows a procedure for a debug dashboard according to some implementations.

FIG. 14 shows a procedure 1400 for a debug dashboard according to some implementations. The procedure 1400 may be performed by the runtime environment 210 (FIG. 2). Further, the debug dashboard may include one or more of the features of debug dashboards described throughout this disclosure, such as the debug dashboard 700 (FIG. 7).

In stage 1402, the runtime environment 210 may display the debug dashboard. The runtime environment 210 may display the debug dashboard on the user interface of the user system 204 (FIG. 2).

In stage 1404, the runtime environment 210 may perform a first node of a syntax tree. The syntax tree may include one or more of the features of the syntax trees described throughout this disclosure, such as the syntax tree 600 (FIG. 6). Performance of the first node may include performing an operation associated with the first node.

In stage 1406, the runtime environment 210 may display a result of the performance of the first node within the debug dashboard. The result may be displayed within a result display, such as the result display 702 (FIG. 7), of the debug dashboard. The runtime environment 210 may display the result of the performance of the first node on the user interface of the user system 204.

In stage 1408, the runtime environment 210 may perform a second node of the syntax tree. The second node of the syntax tree may be configured to be performed subsequent to the first node. The runtime environment 210 may perform the second node in response to a user interaction with the debug dashboard, such as clicking of the button 704 (FIG. 7).

In stage 1410, the runtime environment 210 may display the result of the performance of the second node within the debug dashboard. The result may be displayed within the result display. In some examples, the result of the performance of the second node may replace the result of the performance of the first node within the result display. The runtime environment 210 may display the result of the performance of the second node on the user interface of the user system 204.

Figure 15:
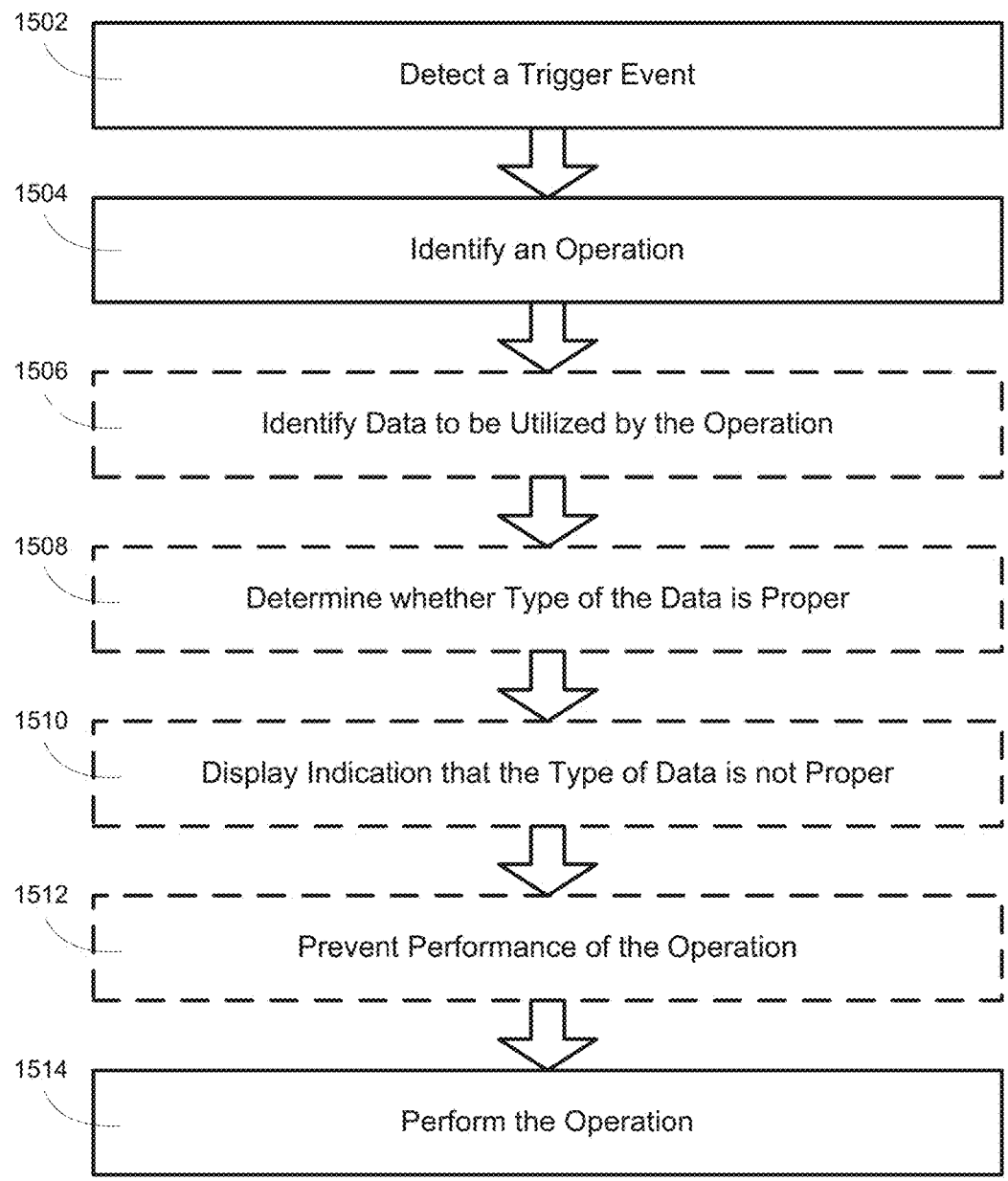
FIG. 15 shows a procedure of performing an operation according to some implementations.

FIG. 15 shows a procedure 1500 of performing an operation according to some implementations. The procedure 1500 may be performed by the runtime environment 210.

In stage 1502, the runtime environment 210 may detect a trigger event within an interactive dashboard displayed on the user interface. The trigger event may include one or more of the features of the trigger events described throughout this disclosure. For example, the trigger event may include a user interaction with a user interface displayed on the interactive dashboard, initiation of a data query by the runtime environment 210, receipt of data from the database system 200 (FIG. 2), performance of another operation, loading of the interactive dashboard for display within runtime environment 210, or some combination thereof.

In stage 1504, the runtime environment 210 may identify an operation configured to be performed within the interactive dashboard in response to the detection of the trigger event. The operation may include one or more of the features of the operations described throughout this disclosure, such as the operation 408 (FIG. 4). The operation may have been defined and associated with the interactive dashboard based on a script entry input into a script field of an editor dashboard of the runtime environment 210. In some examples, the operation may have been generated based on the script entry and assigned to the interactive dashboard based on the script entry.

In stage 1506, the runtime environment 210 may identify data to be utilized by the operation. The data may be obtained from a database system (such as the database system 202 (FIG. 2)), a data agnostic set (such as the data agnostic data set 218 (FIG. 2)) produced by the runtime environment, or some combination thereof. Identifying the data may include performing a query, of the database system, associated with the operation to obtain the data.

In stage 1508, the runtime environment 210 may determine whether the type of the data is proper for the operation. Determining whether the type of the data is proper may include determining whether the format of the data is the format that the operation is expecting, whether the query of the database system returns a 'null' indicator, whether access to the data presents a security risk, or some combination thereof.

In stage 1510, the runtime environment 210 may display an indication that the type of data is not proper for the operation in response to a determination that the type of the data is not proper for the operation. The determination that the type of data is not proper may include determining that the format of the data is not the format that the operation is expecting, that the database system returned a 'null' indicator in response to the query, access to the data presented a security risk, or some combination thereof. The runtime environment 210 may display the indication within the interactive dashboard displayed on a user interface of the user system 204 (FIG. 2).

In stage 1512, the runtime environment 210 may prevent performance of the operation in response to the determination that the type of the data is not proper for the operation.

In some examples, stage 1506, stage 1508, stage 1510, and stage 1512 may be omitted. In these examples, the procedure 1500 may proceed from stage 1504 to stage 1514.

In stage 1514, the runtime environment 210 may perform the operation. The runtime environment 210 may be configured to display a data presentation within the interactive dashboard as part of the operation. The data presentation may include one or more of the data presentations described throughout this disclosure, such as the first data presentation 220 (FIG. 2), the second data presentation 222 (FIG. 2), the third data presentation 224 (FIG. 2), or some combination thereof. In other examples, performing the operation may involve performing one or more of the operations described throughout this disclosure.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A user system, comprising:
   a user interface;
   a processor; and
   one or more stored sequences of instructions which, when executed by the processor, cause the processor to:
   display a script field on an editor dashboard, the editor dashboard configured to generate an operation to be performed within an interactive dashboard of a runtime environment, wherein the operation is configured to:
   analyze results of a data query;
   determine a type of data presentation to display the results within the interactive dashboard based on the results; and
   display the results within the interactive display using the determined type of data presentation;
   identify a script entry input into the script field;
   parse the script entry to identify the operation to be performed within the interactive dashboard in response to a trigger event and to generate a syntax tree for the operation; and
   assign the operation to the interactive dashboard, so that the operation will be performed within the interactive dashboard in response to the trigger event wherein nodes of the syntax tree are configured to be performed within the interactive dashboard in response to the trigger event.

2. The user system of claim 1, wherein the one or more stored sequences of instructions which, when executed by the processor, further cause the processor to:
   display a debug dashboard on the user interface;
   perform a first node of the nodes of the syntax tree;
   display a result of the performance of the first node within the debug dashboard;
   perform a second node of the nodes of the syntax tree, wherein the second node is performed subsequent to the first node in the operation; and
   display a result of the performance of the second node within the debug dashboard.

3. The user system of claim 1, wherein the one or more stored sequences of instructions which, when executed by the processor, further cause the processor to:
   analyze the script entry for syntax errors; and
   in response to identification of a syntax error within the script entry, display an indication of the syntax error.

4. The user system of claim 1, wherein the trigger event includes a user interaction with a data presentation within the interactive dashboard.

5. The user system of claim 4, wherein the operation is configured to update the data presentation based on the user interaction.

6. The user system of claim 1, wherein the operation is configured to:
   determine a format in which to display a portion of data based on the results; and
   using the format to display the portion of the data within a data presentation of the interactive dashboard.

7. The user system of claim 1, wherein the one or more stored sequences of instructions which, when executed by the processor, further cause the processor to:
   determine whether the operation poses a security threat; and
   in response to a determination that the operation poses a security threat, display an indication that the operation poses the security threat in the editor dashboard.

8. The user system of claim 7, wherein the one or more stored sequences of instructions which, when executed by the processor, further cause the processor to prevent performance of the operation within the interactive dashboard.

9. The user system of claim 1, wherein the operation includes a user interface operation that defines at least a portion of a user interface layout to be displayed within the interactive dashboard of the runtime environment.

10. The user system of claim 1, wherein the one or more stored sequences of instructions which, when executed by the processor, cause the processor to:
    convert the script entry into JavaScript code, wherein performance of the operation includes performance of the JavaScript code.

11. The user system of claim 1, wherein the trigger event includes a user interaction with a certain element of a data presentation.

12. A user system, comprising:
    a user interface;
    a processor; and
    one or more stored sequences of instructions which, when executed by the processor, cause the processor to:
    detect a trigger event within an interactive dashboard of a runtime environment displayed on the user interface;
    identify an operation configured to be performed within the interactive dashboard in response to the detection of the trigger event and to generate a syntax tree for the operation, the operation generated and assigned to the interactive dashboard based on a script entry input into a script field of an editor dashboard of the runtime environment, wherein the operation is further configured to:
    perform a data query of a database system for data to be displayed within a data presentation;
    determine a type of the data presentation to be displayed within the interactive dashboard based on results of the data query; and
    display the data presentation within the interactive dashboard, the data presentation being the determined type of the data presentation; and
    perform the operation within the interactive dashboard, the operation configured to display the data presentation within the interactive dashboard wherein nodes of the syntax tree are configured to be performed within the interactive dashboard in response to the trigger event.

13. The user system of claim 12, wherein the operation is to update a previous data presentation displayed within the interactive dashboard to generate the data presentation to be displayed within the interactive dashboard, the previous data presentation displayed when the trigger event was detected.

14. The user system of claim 13, wherein the trigger event was associated with the previous data presentation, and wherein the operation is to update the previous data presentation based on the trigger event being associated with the previous data presentation.

15. The user system of claim 12, wherein the operation is further configured to:
    determine a format in which to display a portion of the data within the data presentation based on the results of the data query; and
    display the portion of the data in the format within the data presentation.

16. The user system of claim 12, wherein the one or more stored sequences of instructions which, when executed by the processor, further cause the processor to:
    identify query data to be utilized by the operation;
    determine whether a type of the query data is proper for the operation; and in response to a determination that the type of the query data is not proper for the operation, display an indication that the type of the query data is not proper for the operation.

17. The user system of claim 16, wherein the one or more stored sequences of instructions which, when executed by the processor, further cause the processor to:
prevent performance of the operation in response to the determination that the type of the query data is not proper for the operation.

18. The user system of claim 12, wherein to perform the operation includes to:
perform one or more nodes of a syntax tree associated the operation.

19. The user system of claim 12, wherein the one or more sequences of instructions which, when executed by the processor, further cause the processor to identify the trigger event based on the script entry.

\* \* \* \* \*